United States Patent [19]

Berger

[11] 4,058,286

[45] Nov. 15, 1977

[54] VALVE WITH DELAYED ACTION CLOSING MEANS

[76] Inventor: Benjamin Berger, Kibbutz Evron, Doar Na Oshrat, Israel

[21] Appl. No.: 398,313

[22] Filed: Sept. 18, 1973

Related U.S. Application Data

[63] Continuation of Ser. No. 299,675, Oct. 24, 1972, abandoned.

[51] Int. Cl.² ............................................. F16K 31/385
[52] U.S. Cl. ...................................... 251/15; 137/486; 137/624.11; 222/20; 251/45
[58] Field of Search ...................... 137/624.14, 624.11, 137/486, 485, 624.12; 251/15, 46, 45, 22, 23, 61, 61.2, 61.5, 36, 249, 248, 250.5, 51, 52, 53, 59; 222/20

[56] References Cited

U.S. PATENT DOCUMENTS

| 981,271 | 1/1911 | Hutchins | 137/624.14 |
|---|---|---|---|
| 1,172,421 | 2/1916 | Beck | 251/36 |
| 1,724,891 | 8/1929 | Anderson | 251/45 X |
| 2,057,333 | 10/1936 | Guibert | 251/15 X |
| 2,229,829 | 1/1941 | Watson | 137/624.14 |
| 2,373,654 | 4/1945 | Beekley et al. | 251/36 X |
| 2,417,994 | 3/1947 | Sheets | 251/45 X |
| 2,573,369 | 10/1951 | Snoody | 251/46 X |
| 2,965,117 | 12/1960 | Gallacher | 137/624.14 X |
| 3,097,762 | 7/1963 | Charnota et al. | 222/20 |
| 3,112,094 | 11/1963 | Nees et al. | 251/46 X |
| 3,556,464 | 1/1971 | Griswold | 251/46 |

FOREIGN PATENT DOCUMENTS 802,763 10/1958 United Kingdom ............ 137/624.14

Primary Examiner—Alan Cohan
Attorney, Agent, or Firm—Weingarten, Maxham & Schurgin

[57] ABSTRACT

A valve having a delayed action closing means comprises a membrane positioned above the valve seat and partitioning the interior of the valve casing into a first and second chamber, a water wheel in the first chamber positioned to be rotated by the incoming water, a shaft from the water wheel acting on a train of gears in the second chamber, an auxiliary valve actuated by the train of gears after the passage of a predetermined quantity of water, a by-pass provided from the upstream part of the valve and leading into the second chamber, and a connection from the auxiliary valve leading into the downstream part of the valve.

5 Claims, 2 Drawing Figures

VALVE WITH DELAYED ACTION CLOSING MEANS

RELATED PRIOR APPLICATION

This is a continuation of application Ser. No. 299,675, filed Oct. 24, 1972, now abandoned.

BACKGROUND OF THE INVENTION

The present invention relates to a valve and more particularly to a valve to be inserted into through-flow conduits which valve is provided with an arrangement for automatically closing it after the passage of a predetermined quantity of fluid.

Many constructions of valves of this kind are known. However, in most of these cases the construction is primarily designed for use with valves which are inserted into small diameter conduits, say those of half an inch up to 2 inches, while the present arrangement is designed for larger diameters.

Valves of this kind usually comprise a valve casing which is constituted by two chambers, partitioned from one another by a diaphragm which carries a valve body adapted to close the through-flow from the inlet to the outlet of the valve. In one of the chambers a water wheel is positioned which is rotated by the flow entering the valve, which water wheel acts on a train of gears in the second chamber of the valve which gear closes an auxiliary valve after the passage of a predetermined quantity of fluid.

Such a valve has been shown and described in Israel Pat. No. 28663. The closing action depends wholly on the resiliency of the diaphragm. Obviously this might result in an unsatisfactory performance of the valve.

In the same construction the said auxiliary valve is arranged within the valve casing and cannot be reached easily for cleaning or repair.

The water wheel of said construction is met by the flow radially.

SUMMARY OF THE INVENTION

It is the object of this invention to eliminate these and further drawbacks of such valves.

In the new construction, the diaphragm serves as a partition only and is no longer under the load of the valve body—the diaphragm being supported, as will be seen, by the casing. Also, in the new construction, the auxiliary valve is easily accessible. The closing movement is initiated by spring means and does not depend on the resilience of the diaphragm.

According to the invention the new valve comprises a valve casing with an inlet and outlet to a pipe line. A valve seat is provided intermediate to the inlet and outlet, and a valve body closes on the scat in a direction opposite to the direction of flow. The valve body is fixedly connected to a membrane positioned above the valve seat and partitioning the interior of the valve casing into a first and a second chamber at the two sides of the same membrane, (in the sense of the flow). This membrane is firmly supported in its marginal peripheral region—at both its extreme positions—on a portion of the valve casing whereby upon closing of the valve, the membrane is substantially wholly supported by the valve casing and by the valve body. A water wheel is provided in the first chamber and is positioned in the path of the rising flow to be axially impinged by the flow. A shaft extends from the hub of the latter wheel through the valve body into the second chamber. The shaft is driven by the water wheel, the latter rotating by action of the flow. The shaft acts on a train of gears accomodated in the second chamber. This train of gears is designed to close an auxiliary valve after passage of a predetermined quantity of water. A by-pass is provided from the upstream portion of the valve and leading into the second chamber, and a connection is provided from the auxiliary valve leading into the downstream part of the valve.

BRIEF DESCRIPTION OF THE DRAWINGS

These and further features will become evident from the following description which has reference to the annexed drawings. In the drawings:

FIG. 1 is an elevational section of the new valve, while

DESCRIPTION OF THE PREFERRED EMBODIMENT

Figure 1:
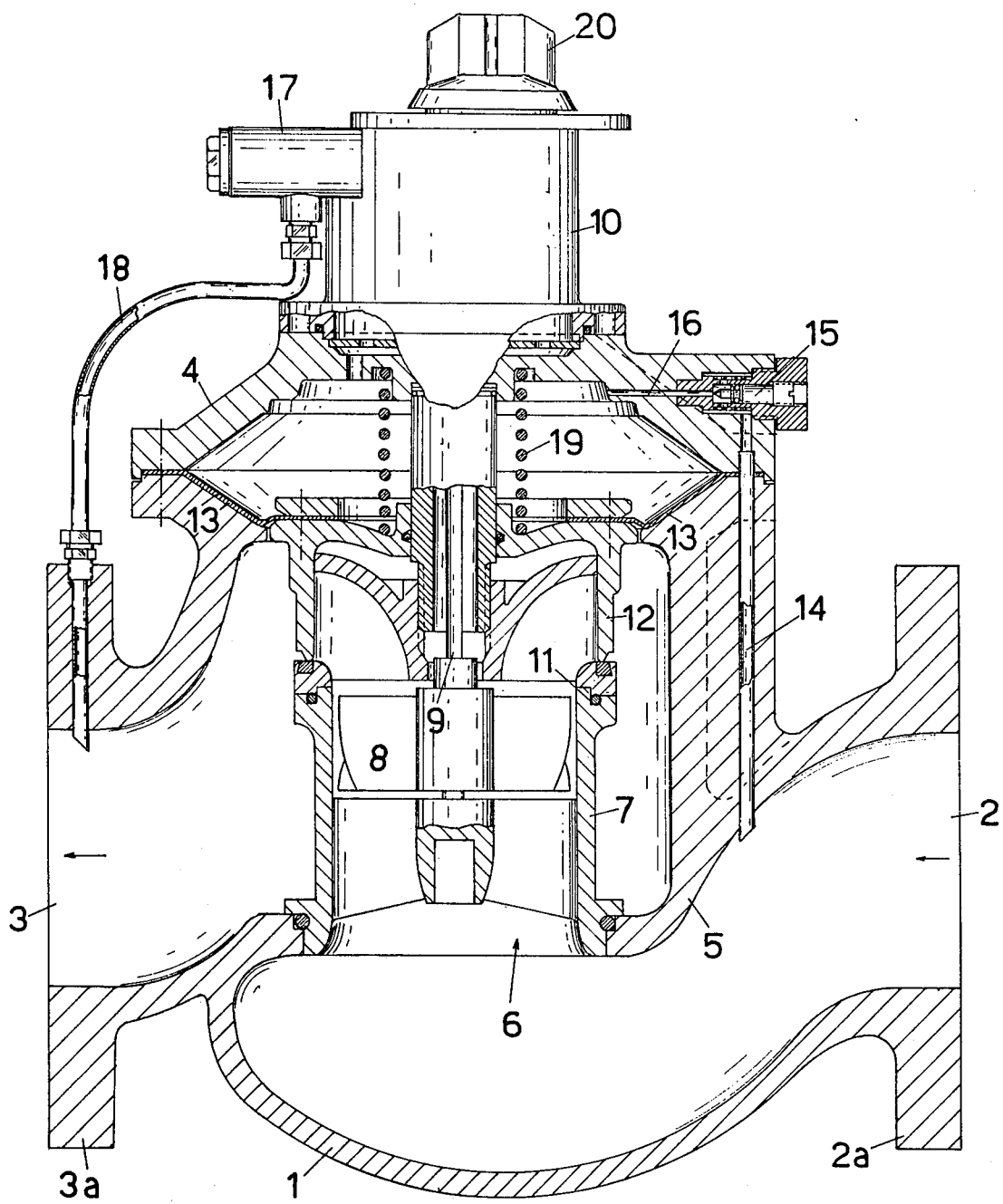

Turning first to FIG. 1, the new valve comprises a valve casing 1 with an inlet 2 and an outlet 3. Both inlet and outlet are provided with flanges 2a and 3a in a conventional manner, for the connection to a pipe line. The casing 1 is closed at top by a bonnet 4. Within the casing 1 and intermediate the inlet 2 and the outlet 3 is provided a partition 5 which has an opening 6. On the opening 6 is seated a hollow, vertically disposed cylindrical body 7 constituting an emplacement for a water wheel 8. The flow of water enters the cylinder 7 in axial direction, thus the water wheel is impinged by the flow axially. The water wheel 8 is connected by a shaft 9 leading upwardly to the interior of a casing 10 within which is provided a rain of gears of known kind, e.g. as employed in flow meters. The top edge of the cylindrical body 7 is formed as valve seat 11 onto which tightly and positively closes a cup shaped valve 12 which is suspended from a membrane 13 which is clampingly held between the edges of the casing 1 and the bonnet 4.

Figure 2:
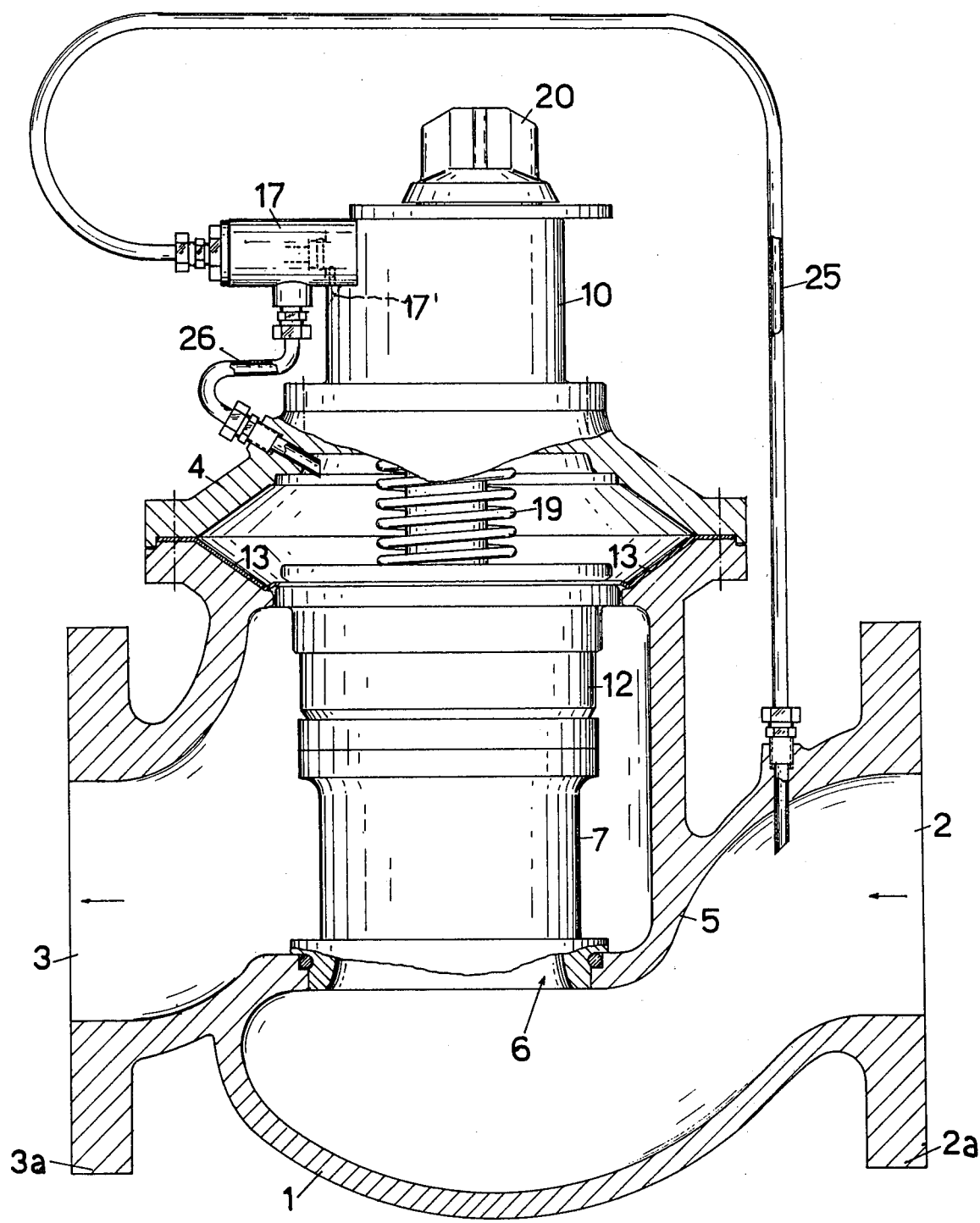
FIG. 2 is a corresponding view of a slightly varied construction

As may be gathered from a glance at FIG. 1, and FIGS. 2, the membrane, in this closing portion, is firmly supported in its peripheral marginal zone on a portion of the valve chest 1. Consequently the stress on the membrane will not cause rupturing of the latter, as might be the case without the strengthening support of the marginal portion of the membrane.

From the upstream portion of the valve, i.e. immediately behind the inlet 2 there leads a bypass 14 to a small valve 15 which can be adjusted to increase or decrease the passage from the bypass 14 into a passage 16 which latter leads into the space above the membrane 13 (the second chamber). The passage 16 is in communication with the interior of casing 10 so that the water entering casing 10 can flow into a valve 17 which permits the passage of the flow from the bypass 14, the passage 16, through a tube 18 back into the downstream portion of the valve casing 1. It might be mentioned here that the valve 17 is accomodated in a separate housing attached to casing 10, so that the interior of valve 17 is always accessible, for repair or cleaning, which might become necessary.

Above the cup-shaped valve body 12 there is provided a spring 19 tending to urge the valve body 12 onto seat 11. On top of casing 10 there is provided a small hand wheel 20, by means of which the train of gears can be adjusted to permit a quantity of water to pass therethrough, whereupon the auxiliary valve 17 is closed.

The new valve described functions as follows: Assuming that the train of gears has been set for a certain quantity of water to pass therethrough, which as has been mentioned, is being done by means of the hand wheel 20, and assuming that the valve 17 is open, the flow through the pipe line will be as follows; water entering at the entrance 2 will flow into direction of the arrows indicated in FIG. 1, will lift the cup shaped valve 12 from its seat 11 and will flow out through the outlet 3. When the valve body 12 is lifted, the membrance 13 is caused to bulge upwardly, its peripheral, marginal portion applying itself against the lower side of the marginal portion of bonnet 4, thus safeguarding the membrane against rupture also in this position. During its passage through the cylindrical body 7 the water meeting the wheel 8 in axial direction will rotate the water wheel, which in turn—via the shaft 9—puts into motion the train of gears. While this flow, which is the main flow, occurs a small quantity of water leaves through the bypass 14, the passage 16, the interior of a casing 10, the valve 17 to flow out through the pipe 18 into a down stream portion of the valve. As soon as the predetermined quantity of water has passed and has moved the train of gears to a predetermined extent, the gear will act on valve 17 and close the latter. Accordingly no water can leave through the passage 18 and pressure from the main, upstream portion will act on the membrane 13 with the result that the valve body 12, under pressure of the main is closed down onto the valve seat 11. To initiate the downward movement and to speed it up, the spring 19 has been provided so that the closure will occur almost instantaneously after the closure of valve 17. It should be remarked that the area on top of membrane 13 is larger than the area underneath the valve body 12, so that the differential of pressure keeps the valve closed.

The arrangement of FIG. 2, to a certain extent is reversal of the action described in connection with FIG. 1.

In the construction according to FIG. 2 the valve casing, the bonnet, the train of gears and the auxiliary valve are the same as already described and identical parts in FIGS. 1 and 2 have been designated by the same numerals. In the construction according to FIG. 2 the bypass 25 leads from the upstream portion of the valve straight into the auxiliary valve 17. From the valve 17 a conduit 26 leads into the space above the valve body 12 and the membrane 13. Thus as long as water is present in the bypass 25, the auxiliary valve 17 and the passage 26 into the space above the membrane 13, pressure is built up on top of the latter and the valve body 12 is kept down on its seat 11, Once valve 17 is closed no pressure from the main, i.e. from the upstream part thereof can act on the membrane and in the absence of such pressure the main flow will lift the valve body from its seat and permit the flow from entrance port 2 to the outlet 3. In order to make this possible an outlet 17' is provided at the valve 17 which outlet, though normally closed is opened automatically with the closure of valve 17, i.e. by the displacement of the valve body thereof.

What is claimed is:
1. A delayed action closing valve comrising:
a valve casing having an inlet and outlet;
a valve seat intermediate said inlet and outlet;
a valve body engageable with said seat;
a membrance connected to said valve body to partition the interior of said valve casing into a first and a second chamber at respective sides of said membrane;
said membrane being firmly supported in its marginal, peripheral region at both its extreme positions by a portion of said valve casing whereby upon closing of the valve, said membrane is substantially wholly supported by the valve casing and by the valve body;
a water wheel rotatably disposed in said first chamber and positioned in the path of the rising flow to be axially impinged by said flow;
a shaft extending from the hub of said wheel through the valve body and said second chamber, said shaft being driven by the water wheel rotation;
by-pass means providing fluid communication from said inlet to said second chamber and from said second chamber to said outlet;
an auxiliary valve disposed along said by-pass means intermediate said second chamber and said outlet;
flow-metering means connected to said shaft above said second chamber;
said auxiliary valve actuated by said flow-metering means into a closed position after passage of a predetermined quantity of water through said delayed action closing valve to cause said valve body to engage said seat.

2. A fluid flow valve with delayed action closing means, comprising:
a valve casing having an inlet, an outlet, an opening at the top, and respective means for connecting the inlet and outlet to a pipe line;
a bonnet mounted over said opening at the top of said valve casing;
a meter casing mounted to said bonnet;
a variable volume flow metering means in said meter casing;
a substantially cylindrical body member mounted within said valve casing intermediate said inlet and outlet;
a water wheel mounted for rotation in said body member;
a shaft extending from said water wheel through said bonnet to said metering means within said meter casing, said shaft and said water wheel being substantially coaxial with said body member;
a valve seat on said body member;
an axially movable closing member positioned within said valve casing above said body member, said closing member having a first position contacting said valve seat to stop fluid flow through said valve, said closing member having a second position extending into said bonnet permitting fluid flow through said valve, said shaft extending through said closing member;
a membrane centrally mounted said closing member and pheripherally clamped between said valve casing and said bonnet thereby forming a chamber above said membrane;
said valve casing being formed with a surface to fully support that portion of the lower surface of said membrane extending radially from said closing member to the clamped periphery of said membrane when said closing member is in said first position, said bonnet being formed with a surface to fully support that portion of the upper surface of said membrane extending radially from said closing member to the clamped periphery of said membrane;

by-pass means providing fluid communication between said inlet and said chamber;

an auxiliary valve mounted to said meter casing, said auxiliary valve having an inlet port and an exhaust port, said inlet port being in fluid communication with said by-pass, said auxiliary valve having a first position and a second position; and a spring biasing said closinhg member to said first position;

whereby when said auxiliary valve is in said first position said closing means is urged to its said first position by means of said sring and fluid pressure in said chamber, and when said auxiliary valve is in said second position, fluid flow through said valve urges said closing member to said second position against the biasing of said spring, permitting direct passage of fluid from said inlet through said body member to said outlet.

3. The valve recited in claim 2, wherein said auxiliary valve is accommodated in a separate housing attached to said meter casing, and accessible from the outside thereof.

4. The valve recited in claim 2 wherein:

said by-pass means provides fluid communication from said chamber to said inlet port of said auxiliary valve and further provides fluid communication from said exhaust port of said auxiliary valve to said outlet of said valve casing;

said metering means being connected to said auxiliary valve to actuate said auxiliary valve after a predetermined number of revolutions of said water wheel, the revolutions of said water wheel being substantially proportional to fluid flow volume;

whereby when a predetermined volume of fluid has passed through said fluid flow valve as determined by said flow metering means, said flow metering means moves said auxiliary valve to its first position, pressure builds up in said chamber and said closing means moves to its first position, stopping fluid flow through said fluid flow valve.

5. The valve recited in claim 2 wherein:

said by-pass means provides fluid communication from said inlet of said valve casing to said inlet port of said auxiliary valve and from said auxiliary valve to said chamber;

said metering means being connected to said auxiliary valve to actuate said auxiliary valve after a predetermined number of revolutions of said water wheel, the revolutions of said water wheel being substantially proportional to fluid flow volume;

whereby when a predetermined volume of fluid has passed through said fluid flow valve as determined by said flow metering means, said flow metering means moves said auxiliay valve to its first position, pressure builds up in said chamber and said closing means moves to its first position, stopping fluid flow through said fluid flow valve, said exhaust port of said auxiliary valve exhausting the pressure within said chamber to permit said closing means to move to said second position and permit fluid to flow through said fluid flow valve when said auxiliary valve moves to said second position.

* * * * *